US010528892B2

(12) United States Patent
Xuan

(10) Patent No.: US 10,528,892 B2
(45) Date of Patent: Jan. 7, 2020

(54) INTELLIGENT RANKING OF NOTIFICATIONS ON A USER DEVICE

(71) Applicant: AirWatch, LLC, Atlanta, GA (US)

(72) Inventor: Chaoting Xuan, Atlanta, GA (US)

(73) Assignee: AirWatch, LLC, Atlanta, GA (US)

( * ) Notice: Subject to any disclaimer, the term of this patent is extended or adjusted under 35 U.S.C. 154(b) by 654 days.

(21) Appl. No.: 15/236,546

(22) Filed: Aug. 15, 2016

(65) Prior Publication Data

US 2018/0046929 A1 Feb. 15, 2018

(51) Int. Cl.
*G06Q 10/00* (2012.01)
*H04L 29/06* (2006.01)

(52) U.S. Cl.
CPC .............. *G06Q 10/00* (2013.01); *H04L 67/42* (2013.01)

(58) Field of Classification Search
CPC ................................ G06Q 10/00; H04L 67/42
See application file for complete search history.

(56) References Cited

U.S. PATENT DOCUMENTS 8,707,201 B1 * 4/2014 Aradhye .............. G06Q 10/107 715/789
2012/0149342 A1 * 6/2012 Cohen ..................... H04L 51/24 455/412.2
2013/0288722 A1 * 10/2013 Ramanujam ............ H04W 4/14 455/466
2013/0346515 A1 * 12/2013 DeLuca ................. G06Q 50/01 709/206
2017/0017351 A1 * 1/2017 Singh ..................... G06Q 10/10

* cited by examiner

*Primary Examiner* — Li B. Zhen
*Assistant Examiner* — Henry Nguyen
(74) *Attorney, Agent, or Firm* — Clayton, McKay & Bailey, PC

(57) ABSTRACT

Systems and methods are provided for accurately setting notification priority levels for applications on a user device. An example system includes a user device and a management server. When an application generates a notification, it provides a priority level for the notification. A management agent executing on the user device can detect the notification and its assigned priority level, determine a predicted priority level using a prediction engine or prediction server, and cause the application the replace or update the assigned priority level based on the predicted priority level. The management agent can then receive user actions related to that notification from the application, and use that information to determine an observed priority level. The prediction engine or prediction server can be updated based on the observed priority level, thereby dynamically increasing the accuracy of predictions.

14 Claims, 4 Drawing Sheets

INTELLIGENT RANKING OF NOTIFICATIONS ON A USER DEVICE

BACKGROUND

User devices often present "notifications" to alert a user that a particular type of data or information has been received by the user device. Most applications can generate notifications. For example, phone, email, messaging, and social media applications are all capable of generating notifications that are displayed on the device by an operating system's notification manager. These notifications can be displayed on the lock screen as well as a notification board (also known as a "notification drawer" in ANDRIOD systems and a "notification center" in iOS systems).

The volume and frequency of notifications can quickly overwhelm a user. To solve this problem, a user must manually adjust the notification settings on the device or risk missing important notifications among a sea of less-important notifications. Even then, the user can miss important notifications if the device is set to filter out too many notifications.

The operating system of a user device typically relies on applications to accurately self-report the importance level of each notification they generate. Using these self-reported values, the operating system's notification manager can prioritize the notifications based on their reported importance level, among other things. Unfortunately, some applications take advantage of this system by artificially inflating the importance levels of their notifications. These applications undermine the notification system and force the user to either correct the issue manually or endure a flood of irrelevant notifications.

Some previous approaches focus on emphasizing the importance of certain notifications based on user behavior. However, these approaches are limited in that they still rely on the self-reported importance level of each notification, which can be manipulated by applications.

As one example, U.S. Pat. No. 8,707,201 describes technology that ranks notifications based on user interactions with the notifications. But these rankings are only applied after the operating system receives application-reported importance levels for notifications. The system, therefore, has no ability to curtail an application from incorrectly reporting importance levels for its notifications. Moreover, that system cannot account for the user's actions within the relevant application itself.

As a result, a need exists for systems and methods that intelligently modify the importance level of notifications before the notifications are provided to a notification manager of the user device.

SUMMARY

Examples described herein include systems and methods for accurately setting notification priority levels for applications on a user device. An example method can include detecting, at a management agent installed on the user device, a first notification generated by a first application. A "notification" can include any type of message or marker that is made available outside of an application. For example, a notification can include a message notifying a user that an email has been received through an email application. In another example, a notification can include a number or other marker that appears on the icon of an application, such as on the home screen of the user device. A notification can include a priority level provided by the application that generated the notification.

The example method can also include determining a predicted priority level for the first notification based on user actions, according to a prediction model. The management agent can then cause the first application to update the priority level for the first notification based on the predicted priority level. For example, the application can be forced to adopt the predicted priority level or adopt an average priority level value based on the predicted priority level and the original priority level.

As the user interacts with the notification, or the application that generated the notification, user actions are generated. These user actions can be sent to the management agent for further processing. For example, the application can be wrapped, injected with features, or developed with a software development kit ("SDK") to report some user actions to the management agent. The management agent can determine an observed priority level based on the user actions. The observed priority level can reflect the actual priority level to the user, based on the user's own actions. Information regarding the observed priority level can then be used to update the prediction model. This process can be repeated iteratively such that the predicted priority levels will more closely match the observed priority levels. Additionally, the repeating nature of this process can adapt to changes in user behavior over time.

In some examples, determining the observed priority level can also include calculating an effective activation time for the notification. Calculating the effective activation time can include calculating an activation time, measured as a time period between when the notification is displayed on the user device and when the user accesses the notification or associated application, and then subtracting a device sleep time, which is the sum of time periods when the device is in a non-interactive state such as being locked, asleep, or off. The effective activation time can be categorized into one of multiple categories, with each category corresponding to a different priority level.

In some examples, the management agent can receive user actions from multiple applications installed on the user device. Determining an observed priority level can be based on the user's interactions with either or both of these applications, relative to one another. Similarly, the predicted priority level can be influenced based on the user's interactions with multiple applications. User actions can be related to reading, replying to, deleting, or otherwise interacting with messages or emails within an application. In appropriate situations, user actions can include a categorization of a sender that is associated with the notification—for example, the sender of an email that prompted the notification.

In another example, a non-transitory, computer-readable medium is provided. The medium can contain instructions that, when executed by a processor, performs stages for setting notification priority levels for applications on a user device. Those stages can include, for example, detecting, at a management agent installed on the user device, a notification generated by a first application. The first application can provide a priority level for the notification. Another example stage can include determining a predicted priority level for the notification based on a prediction model. Yet another example stage can include causing the first application to update the priority level for the notification based on the predicted priority level. A further stage can include receiving, at the management agent, first user actions from the first application related to the notification. Another stage can include determining an observed priority level based on the first user actions. Yet another stage can include updating the prediction model based on the observed priority level.

In another example, a system is provided for setting notification priority levels for applications on a user device. The system can include, for example, a first application installed on the user device. The first application can generate a notification and provide a priority level for the notification. The system can also include a management agent installed on the user device. In some examples, the management agent can detect the notification and determine a predicted priority level for the notification based on a prediction model. Based on the predicted priority level, the management agent can cause the first application to update the priority level for the notification. The management agent can receive user actions related to the notification from the first application. Based on the user actions, the management agent can determine an observed priority level based on the first user actions and update the prediction model based on the observed priority level.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are provided for accurately setting notification priority levels for applications on a user device. An example system includes a user device and a management server. In some examples, the system can also include a prediction server. The management server can be used to enroll the user device and install a management agent on the user device. The management server can also cause the user device to install an application managed by the management agent. When the application generates a notification, it provides a priority level for the notification. The management agent can detect the notification and its assigned priority level, determine a predicted priority level using a prediction engine or prediction server, and cause the application the replace or update the assigned priority level based on the predicted priority level. The management agent can then receive user actions related to that notification from the application, and use that information to determine an observed priority level. The prediction engine or prediction server can be updated based on the observed priority level, thereby dynamically increasing the accuracy of predictions.

Figure 1:
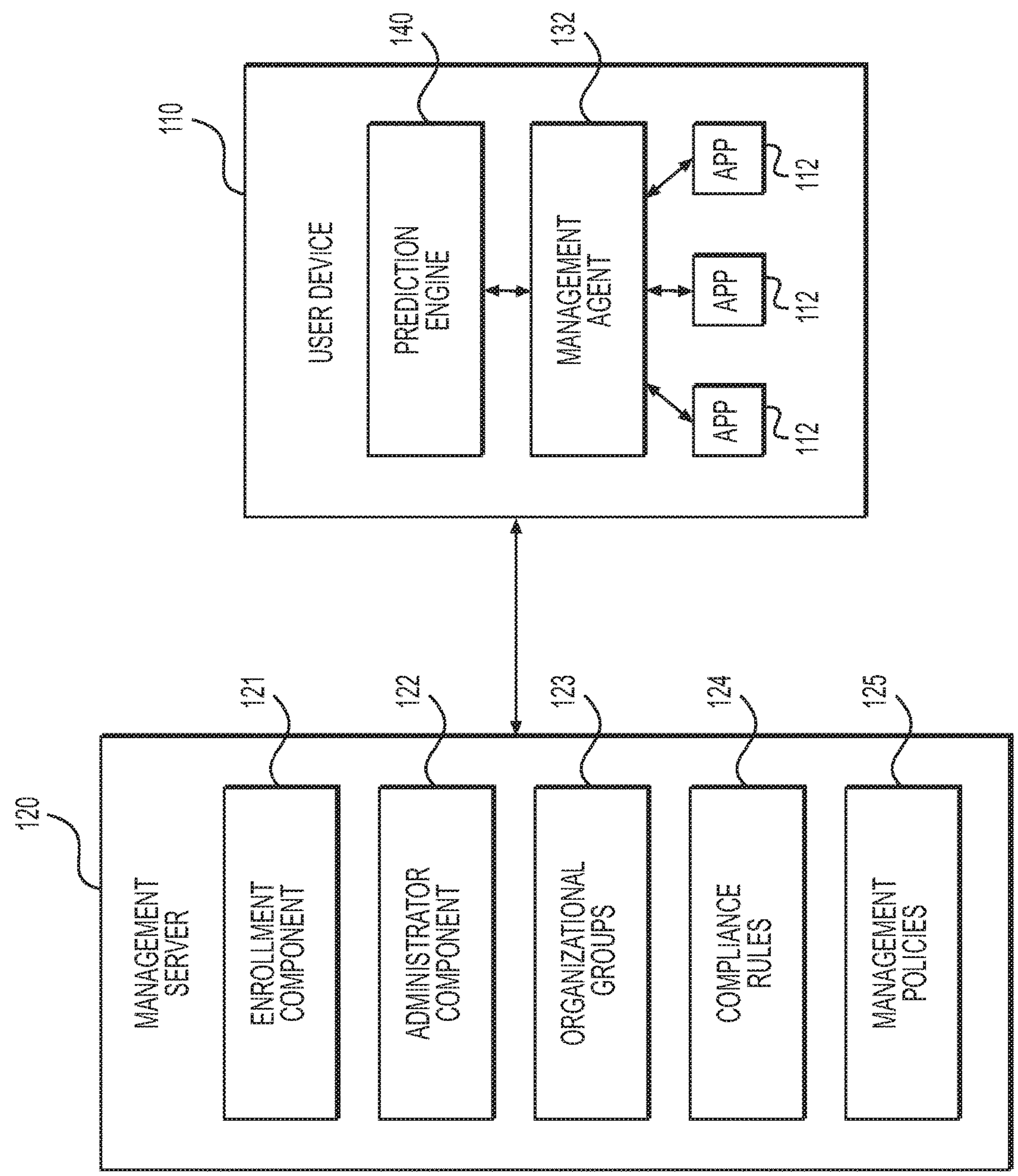
FIG. 1 is an exemplary illustration of system components for intelligently ranking notifications on a user device.
Figure 2:
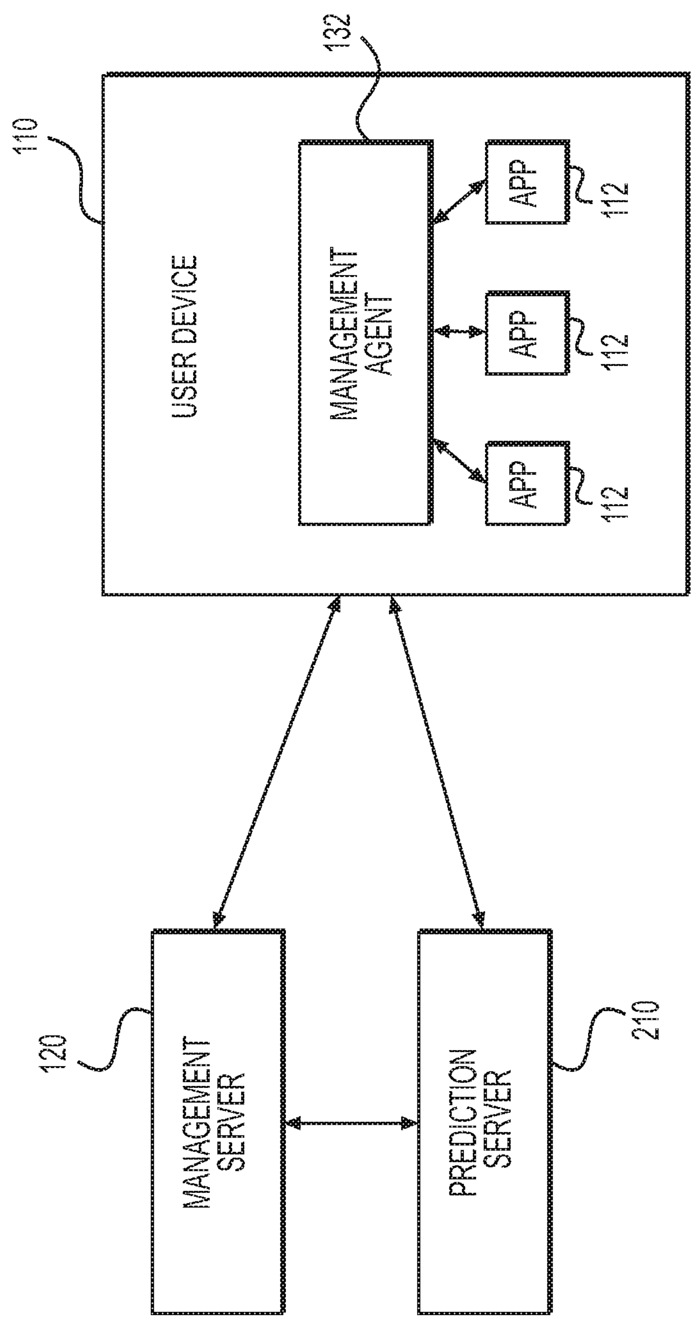
FIG. 2 is another exemplary illustration of system components for intelligently ranking notifications on a user device.
Figure 3:
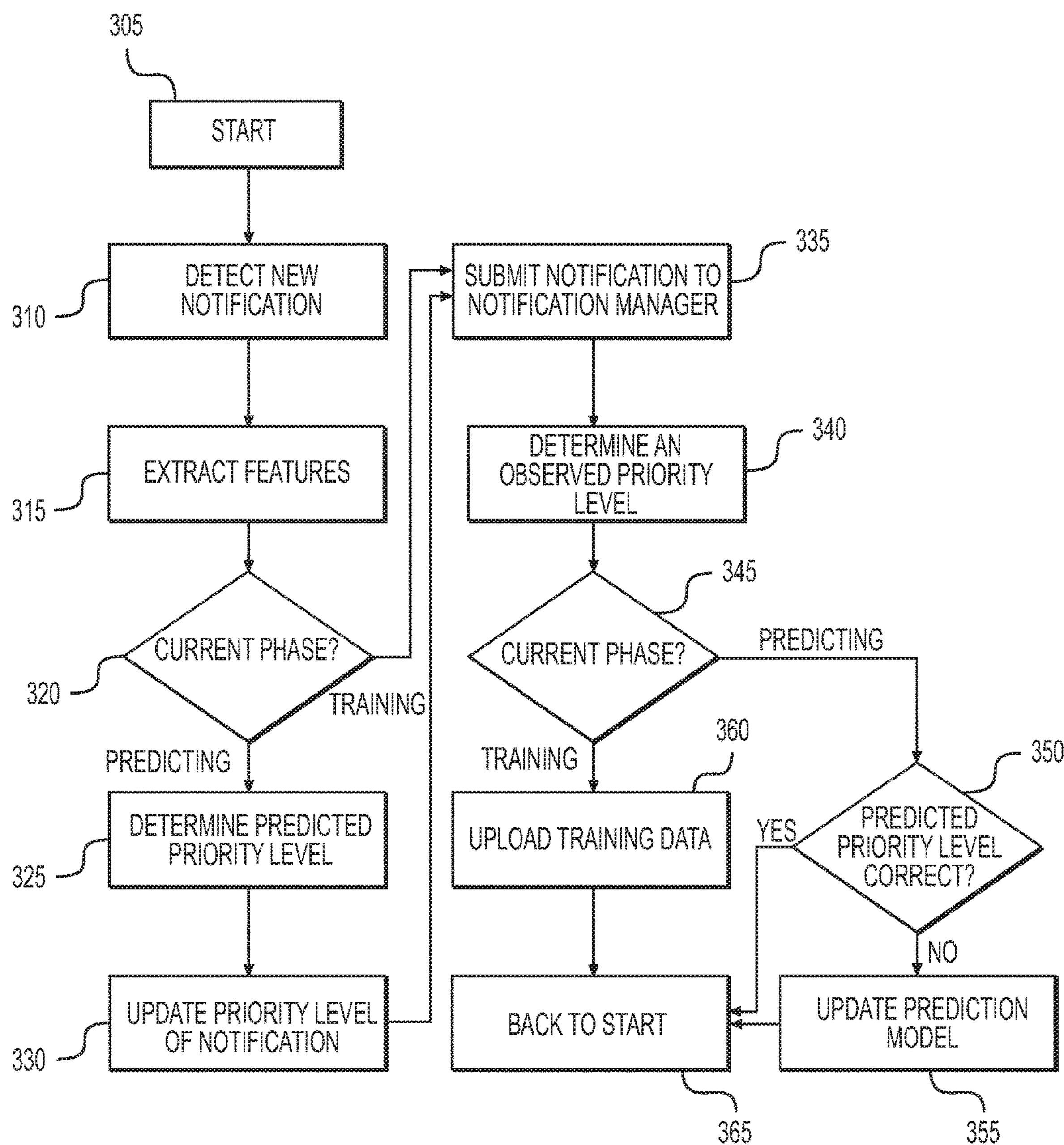
FIG. 3 is a flowchart of an exemplary method of intelligently ranking notifications on a user device, including both a training and predicting phase.
Figure 4:
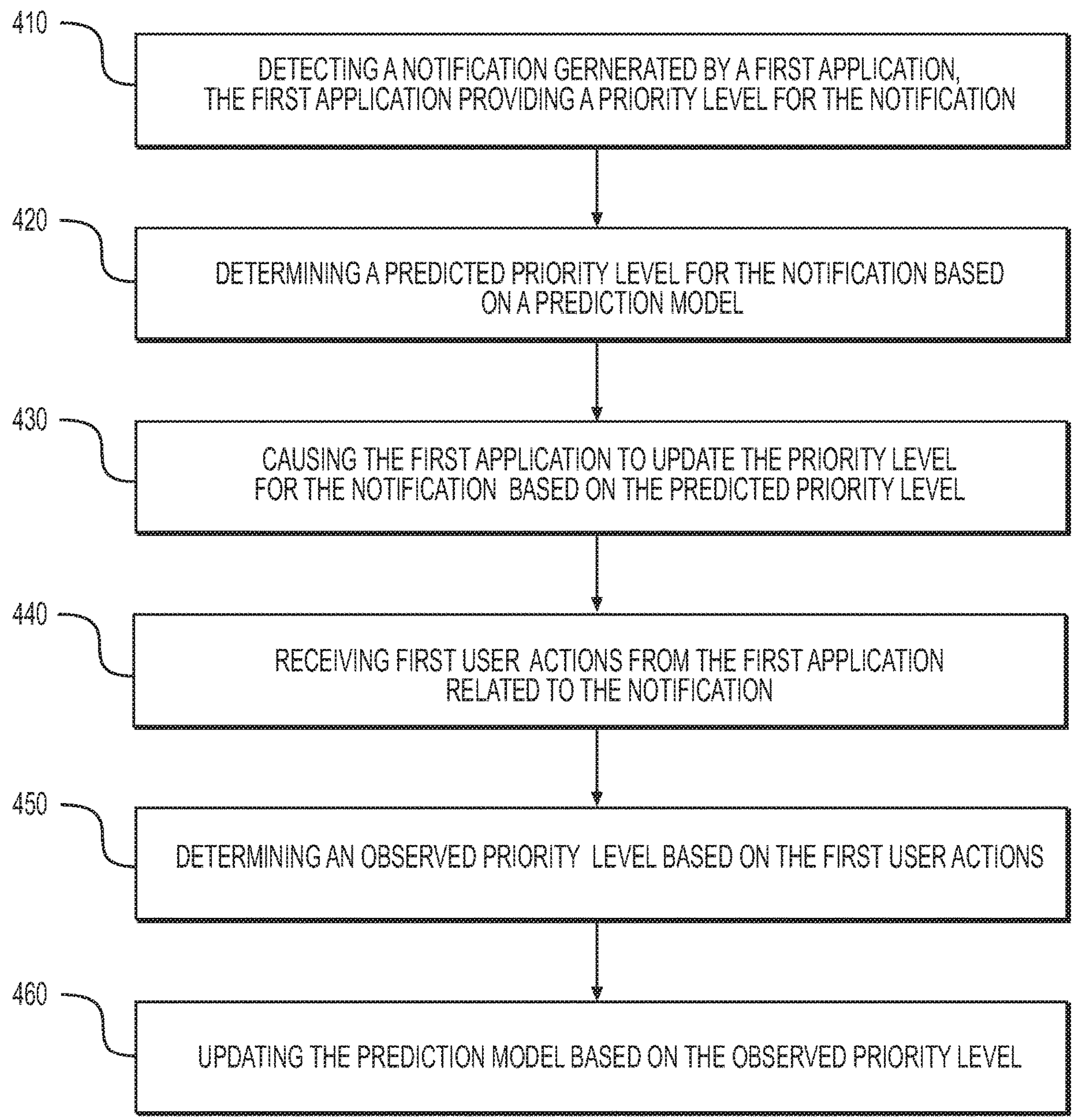
FIG. 4 is a flowchart of another exemplary method of intelligently ranking notifications on a user device.

FIG. 1 provides an illustration and accompanying description of an example system for intelligently ranking notifications on a user device, along with system components for device enrollment and compliance monitoring. In that example, the user device includes a prediction engine for providing a predicted priority level for applications. FIG. 2 illustrates an example using a remote prediction server rather than a user-device-based prediction engine. FIG. 3 provides a flowchart for a method of intelligently ranking notifications that includes both training and predicting phases. FIG. 4 includes flowchart for another example method of intelligently ranking notifications.

Turning to FIG. 1, an illustration of an example system is shown for intelligently ranking notifications on a user device 110. A user device 110 can include any computing device, such as a cell phone, laptop, tablet, personal computer, or workstation. The user device 110 can include a non-transitory computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others. Furthermore, the terms "user device," "device," "user devices," and "devices" are used interchangeably, as appropriate.

The user device 110 can enroll with a management server 120—for example, as part of an overall Enterprise Mobility Management ("EMM") or Mobile Device Management ("MDM") system. The EMM system can include multiple servers, processors, and computing devices. In some examples, the management server 120 is a network of servers, some of which can be located remotely from one another. In another example, the management server 120 is a single server with multiple purposes. In yet another example, the management server 120 can be one or more servers dedicated to the operations described herein.

The management server 120 can monitor and manage the operation of user devices 110, through the management server 120 itself, or more specifically, through a management service or program executing on the management server 120. Although one user device 110 is shown, the management server 120 can monitor and manage the operation of multiple user devices 110 enrolled in a device management service. The management server 120 can also provide access to email, calendar data, contact information, and other enterprise resources to enrolled user devices 110. A system administrator can have privileges associated with managing, editing, revising, and otherwise administrating functions associated with the management server 120.

The management server 120 can include components for enrolling the user device 110 and confirming compliance. These features will be discussed in more detail below. As part of the enrollment process, the management server 120 can cause a management agent 132 to be installed on the user device 110. The management agent 132 can be a portion of an operating system for the user device 110, or it can operate in the application layer of the user device 110. For example, the management agent 132 can be a dedicated application or other software installed on the user device 110 that can monitor and manage data, software components, and hardware components associated with the user device 110. The management agent 132 can monitor and control functionality and other managed applications on the user device 110.

The management agent 132 can be an application, or portion of an application, that provides functionality beyond simply monitoring and managing resources in the user device 110. In one example, a developer can use a SDK to insert, for example, security libraries into the application that can communicate with the management agent 132. In another example, a developer can incorporate libraries and other components through a process of "wrapping." To wrap an application, a developer can decompile the application, insert the libraries or other components, and then recompile the application. When a library is incorporated into an application, the functionality provided by the library can be called by the management agent 132 executing in a user device 110. For example, if a security library provides the ability to monitor and enable or disable functionality provided by an application, the management agent 132 can call functions provided by the library to monitor and enable or disable the functionality.

In addition to installing the management agent 132, the management server 120 can cause other applications 112 to be installed on the user device 110. The user device 110 can also have applications 112 installed through operation of the user device 110 independent from the management server 120. Typically, the management server 120 provides managed applications 112, while independent applications 112 can be downloaded independently, such as from a virtual application store. Although three applications 112 are shown on the user device 110 of FIG. 1, the systems and methods described herein are not limited to any particular number of applications 112.

Applications 112 installed on a user device 110 can generate notifications based on various actions or activities. For example, an email application 112 can generate a notification when an email is received. A calendar application 112 can generate a notification when a meeting invitation is received or when an appointment reminder is generated. A social-media application 112 can generate a notification when the user is tagged in a post. A messaging application 112 can generate a notification when a message is received. A gaming application 112 can generate a notification based on actions taking place in the user's ongoing game. The examples above are merely exemplary and not intended to be limiting in any way. Applications 112 can generate notifications for almost any type of activity related to the application 112.

The operating system of a user device 110 can include a notification manager (sometimes referred to as a "notification center") that handles notifications from various applications. Many operating systems, such as GOOGLE's ANDRIOD or APPLE's iOS, include a built-in notification manager. The notification manager can display notifications in various manners and locations. For example, notifications can be displayed on the lock screen, the home screen, a taskbar, a pull-down menu, or on application 112 icons, among other locations.

The notification manager relies on priority levels for notifications in order to determine how, where, and in what order to display notifications. Notification priority levels are set by the applications 112 themselves. For example, an email application 112 can choose to assign a higher priority level to a notification of an email received from a coworker relative to a notification of an email from an unknown sender. Depending on the particular operating system, the application 112 can choose from a number of predefined priority levels. For example, an operating system can define priority levels 1-5, with 1 being the least important and 5 being the most important. The notification manager can take actions based on the notification priority levels, such as displaying multiple notifications in a particular order or hiding unimportant notifications.

A notification can include a notification object containing data regarding the notification. For example, the notification object can include an application field that identifies the application 112 that generated the notification object, an action field that provides instructions regarding an action to take if the user opens the notification, a text field that includes the text included in the notification display, a time field that includes the time at which the notification issued, a data field that includes data regarding the notification, and a priority field which includes a priority level set by the application 112. The notification object can include additional or different data fields beyond the example fields described above.

The management agent 132 can detect the generation of a notification object associated with a notification. In one example, the management agent 132 receives the notification object or some portion of the notification data from the operating system or the application 112 that generates the notification. In one example, the management agent 132 gathers notification data, such as a notification object, by accessing a native API on the user device 110. For example, an ANDRIOD operating system running on a user device 110 can include a native API that includes various hooks or access points, through which the management agent 132 can gather data. The management agent 132 can make requests to the operating system regarding receiving, retrieving, or otherwise accessing notification objects. In some examples, the management agent 132 receives a notification object or some portion of the notification data from the application 112 that generates the notification. Through the use of wrapping or an SDK, for example, the application 112 can contain instructions to provide a notification object or notification data directly to the management agent 132.

Once the management agent 132 accesses a notification object associated with a notification, it can determine a predicted priority level for that notification. For example, the management agent 132 can extract data from the notification object and provide some or all of that data to a prediction engine 140. The prediction engine 140 can be a module within the management agent 132 or it can be a standalone application or software module on the user device 110. In some examples, such as the example of FIG. 2, the prediction engine 140 can be located remotely from the user device 110.

The prediction engine 140 can use a machine-learning technique to dynamically and intelligently determine predicted priority levels for notifications. While various algorithms can be used for machine learning, an example lightweight, nonlinear algorithm is provided below for performing a binary classification algorithm, also referred to as an online logistic regression.

The algorithm includes a hypothesis function, as shown in Equation 1.

$$_{\theta}=g(\theta^{T}x) \tag{1}$$

In Equation 1, h represents the hypothesis function, θ represents a weight, T represents a transpose operation, x represents a data entry, and g represents a sigmoid function given by Equation 2.

$$g(z)=1\frac{1}{1+e^{-z}} \tag{2}$$

In Equation 2, z represents the product of θ' and x, where θ' is the transpose of θ.

The next equation assumes n data fields, where each data field is a field of a notification object, for example, and m training samples. The cost function J is given by Equation 3.

$$J(\theta) = \frac{1}{m}\sum_{i=1}^{m}[y^{(i)}\log(_{\theta}(x^{(i)}))(1 \quad y^{(i)})\log(1 \quad _{\theta}(x^{(i)}))] \tag{3}$$

The variables described above with respect to Equations 1 and 2 apply to Equations 3 and 4 as well. In Equation 3, y represents a prediction value.

Finally, for each new sample (x', y'):

$$\theta_j = \theta_j \; (_{\theta}(x') \; y')x_j \tag{4}$$

The equations listed above are merely exemplary, and other machine learning algorithms could be used instead of, or in addition to, these equations.

After the prediction engine 140 determines a predicted priority level for a particular notification, the predicted priority level can be provided to the management agent 132. The management agent 132 can then cause an application 112 to modify its reported priority level to something different than the previous priority level originally assigned by the application 112. This can include causing the application 112 to modify its notification object to reflect the predicted priority level. In one example, the management agent 132 provides an instruction to the application 112 to modify the notification object. In response, the application 112 can assign a new value to the priority field of the notification object to match the predicted priority level. In another example, the management agent 132 directly modifies the notification object to match the predicted priority level. If the predicted priority level happens to be the same as the original priority level, then no actions need to be taken with respect to modifying the notification object.

In one example, the applications 112 from which notifications are monitored and updated can include enterprise applications that have been developed using a SDK or wrapped using an app-wrapping process to provide the ability to monitor user interactions within the application and modify the notification level. In other examples, native applications, such as an e-mail application, or third-party applications, such as social media applications, can also be modified to include the ability to track user actions within an application in response to a notification being displayed. The functionality added through the SDK or app-wrapping process also allows the management agent 132 to instruct the application to update its notification levels.

After the management agent 132 or application 112 has caused the notification object to be updated with the predicted priority level, the notification object can be passed to the operating system's notification manager. In some examples, the notification manager does not receive the notification object until after it has been updated to the predicted priority level. In those examples, the notification manager need not be aware that the priority field has been modified. Instead, the notification manager can simply handle the notification object in typical fashion—for example, ranking it against other notification objects such that the higher priority notifications are displayed first on the user device 110.

The management agent 132 can monitor a user's actions within an application 112 before or after a notification has been generated. In one example, the management agent 132 can request a data object from an application 112 that includes information regarding the user's actions within the application 112. In another example, the application 112 sends a data object to the management agent 132 when particular events or user actions occur. The particular information within a data object can depend on the application 112 at issue, and different types of applications 112 can include different information in a data object. In the case of a notification of a new email within an email application 112, a data object can include information regarding whether a user opened the email, whether the user responded (and if so, how long it took to respond), and whether the user deleted, archived, flagged, or forwarded the email. The data object can also include historical information regarding the user's actions. For example, it can include information regarding how often the user opens, responds to, forwards, deletes, or archives messages from particular senders. These user actions can also be the triggering events for the application 112 sending the data object to the management agent 132.

The data object can include categorization of the sender's relationship to the user. Example categorizations include a friend, colleague, supervisor, family member, or unknown. The system can use the categorization to determine the predicted priority level. For example, an unknown sender is generally less of a priority than a supervisor. However, the categorization can be customized for applications that track interaction histories. For example, categorization can be represented as levels based on the quantity and timeliness of interaction with the sender in the past. In this way, the application 112 can report a sender category that reflects a historical priority between the user and the sender.

The types of information contained within a data object provided by an application to the management agent 132 can depend on the particular application 112. In some examples, the instructions for generating or sending the data object can be provided by the management agent 132. In other examples, those instructions can be provided by inserting custom instructions into the application 112 through a SDK or a software wrapping process.

User actions, which are gathered by the management agent 132, can also take the form of timing information. For example, the management agent 132 can receive information regarding what time the user accessed a notification and the time elapsed between the notification being displayed and accessed. The management agent 132 can also determine the duration or durations of time that the user device 110 was in a non-interactive state, such as when the screen is locked or the device is asleep or powered off. The management agent 132 can access this information by, for example, accessing the appropriate hooks or access points in the native API of the operating system. In some examples, the management agent 132 can access this information by requesting it from the application 112 directly.

Based on the gathered information, the management agent 132 can cause an observed priority level to be determined. In some examples the management agent 132 can perform this determination, while in other examples the management agent 132 provides data to the prediction engine 140 and requests a determination from the prediction engine 140. In one example, the observed priority level is determined based on the type of user action. In an email application 112, an action of deleting an item without performing other actions on the item can be rated as a low priority event. However, an effective activation time between the notification and the user activity in the application 112 can also be used to scale the priority rating. If the user acts quickly within the application 112, then this can scale the priority rating upward.

A first effective activation time can be based on the time between the notification and an event reported by the application 112 in an example. In another example, a second notification time can be calculated from the notification to the activation of the notification. The effective activation time can be calculated based on a notification's overall activation time minus the user device's 110 time spent in a non-interactive state during the relevant time period. More specifically, a notification's overall activation time can be calculated as the time between when a notification is displayed on the user device 110 by the notification manager and the time when the notification is accessed by the user. The user can access the notification by, for example, selecting the notification from a lock or home screen, or by simply opening the relevant application 112. The total time spent in a non-interactive state can be calculated as the sum of all time periods—beginning when the notification is displayed and ending when the notification is accessed—that the user device 110 is in a non-interactive state such as being locked, asleep, or off.

To illustrate the effective activation time determination, a hypothetical situation can be envisioned with respect to an email application 112. In this example, an email application 112 generates and displays a notification at time 0. The device is on, with the screen active from time 0 to time 30 (measured in seconds). The device is locked from time 30 to time 100. The device becomes active again at time 101, and remains active until the user accesses the notification at time 145. The notification's overall activation time is 145 seconds (measured from time 0, when the notification was displayed, and time 145, when the notification was accessed). The sum of non-interactive time periods is 70, as the device was locked from time 30 to time 100. The effective activation time is accordingly 75 seconds, calculated as the difference between the overall notification time (145 seconds) and the non-interactive time (70 seconds).

The effective activation time can be used to determine an observed priority level for a notification. The effective activation time can be from the notification to the user action, to the notification activation, or separate values for both can be utilized in the determination. Generally speaking, a shorter effective activation time indicates a higher observed priority level. In some examples, an effective activation time can be categorized into one of multiple categories. In the example of a five-category scheme, the management agent 132 or prediction engine 140 can set four time thresholds against which the effective activation time is measured. For example, the four time thresholds can include a lower threshold, which is less than a medium threshold, which is less than a high threshold, which is less than a maximum threshold. An effective activation time less than the lower threshold can receive the maximum observed priority level, such as a 5 out of 5. An effective activation time between the lower threshold and the medium threshold can receive a high observed priority level, such as a 4 out of 5. An effective activation time between the medium threshold and the high threshold can receive a medium observed priority level, such as a 3 out of 5. An effective activation time between the high threshold and the maximum threshold can receive a low observed priority level, such as a 2 out of 5. Finally, an effective activation time greater than the maximum threshold can receive a minimum observed priority level, such as a 1 out of 5. While five priority levels are used in this example, any number of priority levels and accompanying time thresholds can be utilized.

The time thresholds described above can be static or dynamic. In one example, the management agent 132 provides initial time thresholds that can dynamically change over time in response to various circumstances. For example, the time thresholds can be changed over time in a manner that maintains a desired distribution of observed priority levels. In the example above with five priority levels, the thresholds can be adjusted such that a 3 is the most frequent score, with 2 and 4 being the next most frequent, and 1 and 5 being the least frequent. Machine learning techniques can also be used to adjust the time thresholds.

While effective activation time for a notification can be used to determine an observed priority level for that notification, other methods can also be used. For example, the observed priority level can be based on the user's relative interactions with multiple notifications. In an example, first application 112 and second application 112 can generate independent notifications in a similar timeframe, or while the user device 110 is in a non-interactive state. The user's decision regarding which notification to select first can be used to calculated an observed priority level. For example, a calendar application 112 and an email application 112 can generate notifications while the user device 110 is locked. When the user unlocks device 110, he or she may access the notification associated with the email application 112 before accessing the notification associated with the calendar application 112. In that example, the notification associated with the email application 112 can be assigned a higher observed priority level than the notification associated with the calendar application 112.

A user's actions across different applications 112 can also be used to determine an observed priority level. The management agent 132 can receive first user actions from a first application 112 and second user actions from a second application 112. The timing, duration, and quality of the user actions can be used to determine observed priority levels. In one example, an email application 112 generates two notifications while the user device 110 is locked; one notification associated with a spam email, and one notification associated with an email from a coworker. Additionally, a messaging application 112 can generate a notification while the user device 110 is locked, associated with a text message (e.g., SMS or MMS) from a friend. In this example, the user opens the email application 112 without selecting a notification, and then selects the email from a coworker. The user then reads the email and forwards it to another coworker after adding a few lines of text. Next, the user closes the email application 112 and opens the messaging application 112, reading the text message from a friend but not responding at this time. The user then locks the device 110 for the time being. In this example, the management agent 132 receives information regarding the user's actions within each application. For example, the management agent 132 receives data indicating that the user opened the email from a coworker and forwarded it, did not open or delete the spam email, then opened and read the message within the messaging application 112. These metrics can be used to determine observed priority levels for the various notifications by the management agent 132, either through the prediction engine 140 or the management server 120. In this example, the observed priority level for the coworker's email would be ranked higher than the text message, which would be ranked higher than the spam email.

The observed priority level of a notification can be used to update the prediction model being used by the prediction engine 140. For example, the management agent 132 can feed data to the prediction engine 140 regarding the observed priority level and the relevant circumstances upon which the observed priority level is based. Using this data, the prediction engine 140 can compare the predicted priority level to the observed priority level and update the prediction model based on this comparison.

As mentioned above, the management server 120 can include components for enrolling the user device 110 and confirming compliance. With respect to enrollment, the management server 120 can include an enrollment component 121 and an administrator component 122, either or both of which can be used for the process of enrolling a user device 110. For example, the user device 110 can communicate with the enrollment component 121 during the initial stages of enrollment. In some examples, the enrollment component 121 can provide a token to the user device 110 indicating that the user device 110 has been authenticated and is permitted to communicate and enroll with the management server 120. The management server 120 or enrollment component 121 can provide the user device 110 with information regarding how to access and communicate with the administrator component 122 in order to continue the enrollment process.

In some examples, the administrator component 122 can request a token from the user device 110, indicating that the user device 110 has been authenticated and is permitted to continue the enrollment process with the administrator component 122. Upon receiving the token, the administrator component 122 can continue the enrollment process. The administrator component 122 can also provide a console for an administrator to configure and monitor the status of the user device 110 and the enrollment process. In some examples, the administrator component 122 can be dedicated to a particular enterprise or group of enterprises, while the enrollment component 121 can be shared across multiple different enterprises.

In addition to the enrollment component 121 and administrator component 112 described above, the management server 120 can include one or more organizational groups 123. An organizational group 123 can include data representing a group of user devices 110 managed by the management server 120. An organizational group 123 can correspond to a structure or hierarchy of a business or enterprise. For example, an enterprise can have various groups such as an engineering team, an accounting team, and a marketing team. Each of these teams can correspond to an organizational group 123 stored on the management server 120.

As well as corresponding to a business team, an organizational group 123 can correspond to user devices 110 positioned in a particular geographic location. For example, a business can have different business locations, such as a public waiting room, private conference room, a laboratory, office space, and a parking garage. In this example, separate organizational groups 123 can be established for each of the public waiting room, private conference room, laboratory, office space, and parking garage. User devices 110 positioned in one of these locations can be included in the respective organizational group 123.

The management server 120 can also include compliance rules 124. A compliance rule 124 can set forth one or more conditions that must be satisfied in order for a user device 110 to be deemed compliant. If compliance is broken, the management server 120 can take steps to control access of the user device 110 to enterprise files, applications, and email. Compliance rules can be assigned differently to the different organizational groups 123. For example, a developer group can be assigned different compliance rules 124 than an executive group. The executive group might be allowed to install different applications than the development group. Similarly, the management server 120 can assign different compliance rules 124 based on the different location-based organizational groups 123.

The determination of whether a user device 110 is compliant can be made by the management server 120, the user device 110, or a combination of both. For example, the management agent 132 on the user device 110 can generate a data object that describes the state of the user device 110, including any settings, parameters, applications, or other information regarding the state of the user device 110. The data object can be analyzed by the management server 120 or the user device 110 to determine whether the user device 110 is in compliance with compliance rules 124. In the case of the user device 110 analyzing compliance, a management agent 132 installed on the user device 110 can make the comparison between the data object and compliance rules 124.

In some examples, a compliance rule 124 can specify one or more triggering conditions. If a triggering conditions occurs, the system can react accordingly. For example, the management server 120 can automatically perform one or more remedial actions. In another example, the management server 120 can prompt an administrator to take one or more remedial actions. In some cases, remedial actions can be staged, such that the user of a user device 110 is provided with a chance to remedy their noncompliance before being subjected to stricter remedial actions.

A management policy 125 can specify that a user device 110 has permission to perform or access certain functionality. For example, the user device 110 can be restricted to certain enterprise repositories and functions within applications. In one example, the management policy 125 applies to an organizational group 123, with which the user device 110 can be associated. The organizational group 123 can change over time and include different user devices 110 over time. But because the management policy 125 is associated with the organizational group 123 rather than the any particular user device 110, the management policy 125 can apply to all user devices 110 within the organizational group 123 at any given time.

In one example, the user device 110 can become a member of, or become associated with, an organizational group 123 when an administrator specifies that the user device 110 should be a member. In another example, the user device 110 becomes associated with an organizational group 123 when a membership condition is satisfied, such as through a dynamic evaluation of the membership condition. A membership condition can be created by an administrator 110 by specifying a condition relating to the user device 110 that, when satisfied, causes the user device 110 to be associated with the organizational group 123. Similarly, the membership condition can be created such that when a condition relating to the user device 110 is met (or not met), the user device 110 is removed from the organizational group 123.

Alternatively, a user device 110 can become disassociated with an organizational group 123 based on the user of the user device 110. For example, an administrator 110 or dynamic evaluation can identify an individual for additional to, or removal from, an organizational group 123. If the user operates multiple user devices 110, all of the user's user devices 110 can be added to, or removed from, the organizational group 123 of interest. In this way, all of the user's user devices 110 can be made subject to a uniform set of management policies 125 and compliance rules 124.

As part of the enrollment or management of a user device 110, an administrator 110 can create a device record for the user device 110. The device record can be stored on the management server 120, and can include data related to the management of the user device 110. For example, the device record can include data describing one or more of: the identity and type of the user device 110; components of the user device 110; the state of the user device 110; organizational groups 123 to which the user device 110 belongs; compliance rules 124 with which the user device 110 must comply; and management policies 125 that specify if, when, and how the user device 110 is permitted to function.

For example, data describing the identity and type of the user device 110, as well as the components of the user device 110, can include at least one or more of: a unique identifier associated with the user device 110; a device type of the user device 110 (e.g., a smartphone, a tablet computing, a laptop computer, a desktop computer, a server computer, or a virtualized instance of any of such computer types); and various software and hardware components of the user device 110 (e.g., operating system (or kernel or bios) type and version, processor type and speed, memory type and size, network interface types, various I/O component types such as camera, touchscreen, keyboard, mouse, printer).

The device record can also include data describing the state of the user device 110 can include, for instance, various settings that are applied to the user device 110. The data can also specify various applications that are installed on or being executed by the user device 110, and various files that are installed on or are accessible to the user device 110. Additionally, the data describing the state of the user device 110 can specify information related to the management of the user device 110, such as the last time the user device 110 provided data describing its state to the management server 120. The data can also describe whether the user device 110 is in a state of compliance with any applicable compliance rules 124, and whether any remedial actions have been (or are to be) taken as a result of a noncompliance with any applicable compliance rules 124.

The data describing organizational groups 123 to which the user device 110 belongs can, for example, include any organizational groups 123 of which the user device 110 is a member, either by virtue of a hard-coded relationship between the user device 110 and the organizational group 123, or by virtue of a dynamic evaluation of a membership condition associated with the organizational group 123.

The data describing compliance rules 124 with which the user device 110 must comply can, for instance, specify one or more remedial actions that should be performed in the event that an associated rule condition occurs. Data describing management policies 125 can include permissions of the user device 110, such as access rights, and settings that are being enforced upon the user device 110. In some examples, the data describing compliance rules 124 and the data describing management policies 125 can be obtained from an organizational record associated with an organizational group 123 to which the user device 110 is a member.

In some examples, an administrator 110 can manually input data into the administrator component 122 in order to generate a device record for a user device 110. In other examples, the administrator component 122 can obtain a data object, such as an electronic spreadsheet, extensible markup language (XML) file, or comma separated values (CSV) file. The administrator component 122 can extract information describing the user device 110 from the data object to create a corresponding device record. The device record for each user device 110 can include information identifying each user device 110 and its respective device record.

In some examples, after the administrator component 122 creates a device record for a user device 110, the management server 120 can detect whether the user device 110 is enrolled. For example, the management server 120 can determine whether a flag is set, indicating that the user device 110 is enrolled.

If the user device 110 is not yet enrolled, the management server 120 can automatically transmit information identifying the user device 110 to the enrollment component 121. For example, the user device 110 can transmit a device identifier, such as its media access control (MAC) address, to the enrollment component 121. In some examples, when the enrollment component 121 receives the device identifier, the enrollment component 121 can determine whether a corresponding device record exists. If there is no corresponding device record, the enrollment component 121 can determine that the user device 110 is not authorized to enroll.

FIG. 2 provides an illustration of another example system for intelligently ranking notifications on a user device 110. The user device 110 includes a management agent 132 and various applications 112, as described in FIG. 1. The user device 110 can be managed by a management server 120 that handles enrollment, compliance, and other management functions as described above.

The system of FIG. 2 also includes a prediction server 210. The prediction server 210 can include one or more servers, processors, and computing devices. In some examples, the prediction server 210 is a network of servers, some of which can be located remotely from one another. In another example, the prediction server 210 is a single server with multiple purposes.

In yet another example, the prediction server 210 is one or more servers dedicated to the operations described herein.

The prediction server 210 can supplement the prediction engine 140 of FIG. 1 or completely replace it. For example, the user device 110 can include a prediction engine 140 as a module within the management agent 132 or as a standalone application or software module on the user device 110. The prediction engine 140 can process less-intensive stages, such as gathering and sorting data. In some examples, the prediction engine 140 can determine an observed priority level based on user actions. The prediction engine 140 can then feed its determinations, along with any other applicable data, to the prediction server 210. The management agent 132 can also send relevant data to the prediction server 210.

After receiving the necessary data from the user device 110, the prediction server 210 can process the data using machine-learning techniques, such as those described above with respect to Equations 1-4. The prediction server 210 can then send results back to the user device 110. In some examples, the prediction server 210 sends the results to the management server 120, which then sends them to the user device 110. Because machine-learning calculations can be quite processor intensive, the user device 110 conserved energy by offloading these calculations to the prediction server 210.

The machine-learning calculations can be used to determine a predicted priority level for a notification. Typically, the goal is to predict a priority level for a notification as quickly as possible after the notification is generated. This allows the management agent 132 to update the notification object to include the predicted priority level, rather than the original priority level. During the time that elapses between notification generation and prediction of its priority level, the management agent 132 has various options. In one example, the management agent 132 can hold the notification until the predicted priority level is available, and then provide the updated notification object to the notification manager of the operating system. In another example, the management agent 132 can allow the original notification object to be sent to the notification manager, but then resubmit a modified notification object after receiving a predicted priority level. In another example, the management agent 132 can cause the application 112 to update its notification object so that future notifications will be at the predicted priority level. The management agent 132 can first verify that the observed priority level coincides with the predicted priority level before causing the application 112 to adopt that priority level.

In examples where the prediction server 210 is unresponsive, the management agent 132 can choose to perform the calculations locally through the prediction engine 140. In other examples where the prediction server 210 is unresponsive, the management agent 132 can choose not to modify the notification object, or to delay modifying the notification object until the prediction server 210 is responsive.

Although the prediction server 210 and management server 120 are depicted in FIG. 2 as separate components, they can be part of a shared component. For example, the management server 120 can include a prediction engine with similar functionality as the prediction server 210 described herein. Other configurations are possible to achieve the goals of accurate and fast predictions for notifications.

FIG. 3 provides a flowchart for intelligently ranking notifications that includes both training and predicting phases. This flowchart, or portions thereof, can be carried out by a processor, executed by system components as method, or otherwise carried out by a system such as those discussed above with respect to FIGS. 1 and 2.

In the flowchart of FIG. 3, the first stage 305 includes starting the procedure. Starting can encompass executing a software program or application, turning on a device, or resuming a previously paused process. This stage can include "listening" for a new notification to be generated. For example, this stage can include scanning API hooks to determine whether a new notification has been generated.

Stage 310 can include detecting a new notification. For example, the management agent 132 installed on a user device 110 can detect the creation of a new notification object by the operating system of the user device 110. In some examples the management agent 132 can continuously or periodically scan one or more API hooks of the operating system or an application 112 to recognize the new notification object. In other examples, the operating system can push the notification object in a manner that alerts the management agent 132.

After detecting a new notification, various features of the notification can be extracted at staged 315. In one example, the management agent 132 extracts data from various fields within a notification object associated with the notification. These fields can include, for example, an application field that identifies the application 112 that generated the notification object, an action field that provides instructions regarding an action to take if the user opens the notification, a text field that includes the text included in the notification display, a time field that includes the time at which the notification issued, a data field that includes data regarding the notification, and a priority field that includes a priority level set by the application 112. Additional fields may be available depending on the particular application 112 generating the notification.

At stage 320, the system determines whether it is in a "training" mode or a "predicting" mode. This determination can be made by the prediction engine 140, prediction server 210, or both. Generally, the training mode is used to allow the system to learn the user's preferences without influencing the priority levels of notifications as provided by an application 112. The predicting mode, on the other hand, is intended to predict a priority level for a notification and substitute the predicted priority level for the original priority level. If the system is in predicting mode, it continues to stage 325 (otherwise, stages 325 and 330 can be skipped).

At stage 325, the system determines a predicted priority level for a notification. For example, the management agent 132 can extract data from the notification object and provide some or all of that data to a prediction engine 140, prediction server 210, or both. The prediction engine 140 or prediction server 210 can use a machine-learning technique, such as those discussed with respect to FIG. 1, to dynamically and intelligently determine predicted priority levels for notifications. Once a predicted priority level has been determined by the prediction engine 140 or prediction server 210, the system can carry out stage 330.

At stage 330, the priority level of the notification is updated to the predicted priority level. For example, the management agent 132 can cause an application 112 to modify the notification object to reflect the predicted priority level rather than the previous priority level originally assigned by the application 112. In one example, the management agent 132 provides an instruction to the application 112 to modify the notification object, such as by rewriting the priority field of the notification object to match the predicted priority level. In another example, the management agent 132 directly modifies the notification object to match the predicted priority level. In still another example, the management agent 132 sends a message to the operating system, which then negotiates with the application 112 to change the priority level. If the predicted priority level happens to be the same as the original priority level, then no actions need to be taken with respect to modifying the notification object.

At stage 335, the notification is submitted to the notification manager of the operating system. If the system is in a training mode, then the original notification object can be passed to the notification manager as it normally would. If the system is in a predicting mode, then the updated notification object, rather than the original notification object, is passed to the notification manager. The notification manager need not be aware that the priority field has been modified. Instead, the notification manager can simply handle the notification object in typical fashion—for example, ranking it against other notification objects such that the higher priority notifications are displayed first on the user device 110.

Stage 340 involves determining an observed priority level. The management agent 132 can monitor a user's actions within an application 112 to gather information upon which to determine the observed priority level of a notification. For example, the management agent 132 can request a data object from an application 112 that includes information regarding the user's actions within the application 112. The particular information within a data object can depend on the application 112 at issue, and different types of applications 112 can include different information in a data object. In some examples, the instructions for generating or sending the data object can be provided by the management agent 132. In other examples, those instructions can be provided by inserting custom instructions into the application 112 through a SDK or a software wrapping process. User actions can also take the form of timing information. For example, the management agent 132 can receive information regarding what time the user accessed a notification and the time elapsed between the notification being displayed and accessed. The management agent 132 can also determine the duration or durations of time that the user device 110 was in a non-interactive state, such as when the screen is locked or the device is asleep or powered off. The management agent 132 can access this information by, for example, accessing the appropriate hooks or access points in the native API of the operating system. In some examples, the management agent 132 can access this information by requesting it from the application 112 directly.

In one example, the application 112 uses content identifiers to track content such as emails, texts, posts, or other content that is the subject of a notification. The application 112 can associate a notification identifier with the content identifier. In this arrangement, the management agent 132 can request a user action specific to a notification identifier. The application 112, in response, can associate the notification identifier with the content identifier and return information regarding events and user actions that are also associated with the content identifier.

The combination of timing information and a user's interaction within an application 112 can also be used to set notification levels. A user may quickly select a displayed notification, which may suggest importance of the notification, but then perform an action that indicates the notification should be given a low priority. As an example, when an email application creates a notification, the user may quickly select the notification and access the email application. Traditional approaches to learning a user's interactions with a notification would therefore rank this notification as higher importance given the inability to track a user's actions within the application itself.

However, if the user immediately deletes the e-mail after accessing the application, the priority ranking should have actually been lowered. In this case, parameters of the email can be tracked to assist the machine learning algorithm to appropriately set priority levels for future notifications. For example, the sender of the message, the time at which the message was sent, the person the message was sent to, the subject, and the body of the message can all be analyzed to appropriately modify notification rankings. If a user frequently deletes emails from a particular user, then the notification ranking for future emails from that sender can be lowered. Similarly, deleting or ignoring e-mails that are sent to email distribution lists indicates that the notification priority should be lowered. Lowering the notification ranking can cause the less-important notifications to be displayed lower in among a list of notifications, or not at all. In contrast, if a user frequently opens and responds to emails from certain users or with a given subject line, the notification ranking can be dynamically updated to ensure that a user quickly learns about the notification.

The machine learning algorithm can also integrate with the previously mentioned enterprise mobility system, allowing information relating to a user's organizational role and responsibilities to influence the priority ranking of notifications. For example, the organizational hierarchy can be accessed so that notifications associated with a user's supervisor (e.g., emails, posts on social media, or calendar events with meetings including the supervisor) can have a more highly ranked notification.

Based on the gathered information, the management agent 132 can cause an observed priority level to be determined. In some examples, the management agent 132 can perform this determination, while in other examples the management agent 132 provides data to the prediction engine 140 or prediction server 210 and requests a determination from the prediction engine 140. The observed priority level of a notification can be determined from any relevant information. In one example, the observed priority level of a notification is determined based on an effective activation time for that notification, as discussed with respect to FIG. 1.

At stage 345, the system determines whether it is operating in training mode or predicting mode. If the system is operating in training mode, it proceeds to stage 360. At stage 360, the training data is uploaded to the management server 120 or prediction server 210. This data can include the data used to determine an observed priority level at stage 340, for example. The data can be used to refine the prediction models used by the prediction server 210 or prediction engine 140. If the system is in prediction mode, it proceeds to stage 350.

At stage 350, the system determines whether the predicted priority level was correct. This determination can be done by comparing the predicted priority level with the observed priority level. If the two agree, then the prediction was correct. If they do not agree, the prediction was not correct. If the prediction was correct, the system can simply proceed to stage 365, which reverts the system back to the START operation at stage 305.

If the prediction was not correct, the prediction model can be updated at stage 355. This can include changing predefined weights or other variables in Equations 1-4. The prediction engine 140 or prediction server 210 can dynamically determine how to adapt the equations to adjust for an incorrect prediction. For example, the equations may be adapted to a larger extent when the prediction is off by a large degree, and to a lesser extent when the prediction is off by a smaller degree. After updating the prediction model, the system proceeds to stage 365, which reverts the system back to the START operation at stage 305.

FIG. 4 provides a flowchart of another exemplary method of intelligently ranking notifications on a user device 110. Stage 410 includes detecting a notification generated by a first application 112. The first application 112 can provide a priority level for the notification. For example, the first application 112 can provide a priority level by providing a value in the priority field of a notification object associated with the notification. The management agent 132 can detect the new notification by, for example, accessing exposed hooks of the native API of the operating system.

Stage 420 can include determining a predicted priority level for the notification based on a prediction model. For example, the management agent 132 can extract data from the notification object and provide some or all of that data to a prediction engine 140, prediction server 210, or both. The prediction engine 140 or prediction server 210 can use a machine-learning technique, such as those discussed with respect to FIG. 1, to dynamically and intelligently determine predicted priority levels for notifications.

Stage 430 can include causing the first application 112 to update the priority level for the notification based on the predicted priority level. For example, the management agent 132 can cause an application 112 to modify the notification object to reflect the predicted priority level rather than the previous priority level originally assigned by the application 112. In one example, the management agent 132 provides an instruction to the application 112 to modify the notification object, such as by rewriting the priority field of the notification object to match the predicted priority level. In another example, the management agent 132 directly modifies the notification object to match the predicted priority level. If the predicted priority level happens to be the same as the original priority level, then no actions need to be taken with respect to modifying the notification object.

Stage 440 can include receiving first user actions from the first application 112 related to the notification. For example, the management agent 132 can request a data object from an application 112 that includes information regarding the user's actions within the application 112. The particular information within a data object can depend on the application 112 at issue, and different types of applications 112 can include different information in a data object. In some examples, the instructions for generating or sending the data object can be provided by the management agent 132. In other examples, those instructions can be provided by inserting custom instructions into the application 112 through a SDK or a software wrapping process. User actions can also take the form of timing information. For example, the management agent 132 can receive information regarding what time the user accessed a notification and the time elapsed between the notification being displayed and accessed. The management agent 132 can also determine the duration or durations of time that the user device 110 was in a non-interactive state, such as when the screen is locked or the device is asleep or powered off.

Stage 450 can include determining an observed priority level based on the first user actions. In some examples, the management agent 132 can perform this determination, while in other examples the management agent 132 provides data to the prediction engine 140 or prediction server 210 and requests a determination from the prediction engine 140. The observed priority level of a notification can be determined from any relevant information. In one example, the observed priority level of a notification is determined based on an effective activation time for that notification, as discussed with respect to FIG. 1.

Stage 460 can include updating the prediction model based on the observed priority level. This can include changing predefined weights or other variables in Equations 1-4. The prediction engine 140 or prediction server 210 can dynamically determine how to adapt the equations to adjust for an incorrect prediction. For example, the equations may be adapted to a larger extent when the prediction is off by a large degree, and to a lesser extent when the prediction is off by a smaller degree.

As a result, a notification ranking can, in one example, be adaptively set on a notification-by-notification basis based on timeliness and a user's prior interactions within an application after receiving similar notifications. Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for setting notification priority levels for applications on a user device, comprising:

detecting, at a management agent installed on the user device, a notification generated by a first application, the first application providing a priority level for the notification;

determining a predicted priority level for the notification based on a prediction model;

causing the first application to update the priority level for the notification based on the predicted priority level;

receiving, at the management agent, first user actions from the first application related to the notification;

determining an observed priority level based on the first user actions, including calculating an effective activation time for the notification, wherein calculating the effective activation time comprises:

calculating an activation time, wherein the activation time is a time period between when the notification is displayed and when the user accesses the notification; and subtracting from the activation time a device sleep time, wherein the device sleep time is a sum of time periods when the device is in a non-interactive state, wherein the activation time differs from the effective activation time; and updating the prediction model based on the observed priority level.

2. The method of claim 1, further comprising categorizing the effective activation time into one of a plurality of a categories, wherein each of the plurality of categories corresponds to a different priority level.

3. The method of claim 1, further comprising receiving, at the management agent, second user actions from a second application on the user device, wherein determining the observed priority level is based on the first and second user actions.

4. The method of claim 1, wherein the first user actions are related to reading, replying to, or deleting messages within the first application.

5. The method of claim 1, wherein the first user actions include a categorization of a sender that is associated with the notification.

6. The method of claim 1, wherein the management agent causes a prediction generator to determine the predicted priority level, wherein the prediction generator is a server located remotely from the user device.

7. A non-transitory; computer-readable medium containing instructs that, when executed by a processor, performs stages for setting notification priority levels for applications on a user device, the stages comprising:

detecting, at a management agent installed on the user device, a notification generated by a first application; the first application providing a priority level for the notification; determining a predicted priority level for the notification based on a prediction model; causing the first application to update the priority level for the notification based on the predicted priority level;

receiving, at the management agent, first user actions from the first application related to the notification;

determining an observed priority level based on the first user actions, including calculating an effective activation time for the notification, wherein calculating the effective activation time comprises: calculating an activation time, wherein the activation time is a time period between when the notification is displayed and when the user accesses the notification; and subtracting from the activation time a device sleep time, wherein the device sleep time is a sum of time periods when the device is in a non-interactive state, wherein the activation time differs from the effective activation time; and updating the prediction model based on the observed priority level.

8. The computer-readable medium of claim 7, wherein the stages further comprise categorizing the effective activation time into one of a plurality of a categories, wherein each of the plurality of categories corresponds to a different priority level.

9. The computer-readable medium of claim 7, wherein the stages further comprise receiving, at the management agent, second user actions from a second application on the user device, wherein determining the observed priority level is based on the first and second user actions.

10. The computer-readable medium of claim 7, wherein the stage of determining a predicted priority level further comprises causing a prediction generator to determine the predicted priority level, wherein the prediction generator is a server located remotely from the user device.

11. A system for setting notification priority levels for applications on a user device, comprising:

a first application, installed on the user device, that generates a notification and provides a priority level for the notification;

a management agent, installed on the user device, that:

detects the notification;

determines a predicted priority level for the notification, based on a prediction model;

causes the first application to update the priority level for the notification based on the predicted priority level;

receives first user actions, related to the notification, from the first application;

determines an observed priority level based on the first user actions, including calculating an effective activation time for the notification, wherein calculating the effective activation time comprises:

calculating an activation time, wherein the activation time is a time period between when the notification is displayed and when the user accesses the notification; and subtracting from the activation time a device sleep time, wherein the device sleep time is a sum of time periods when the device is in a non-interactive state, wherein the activation time differs from the effective activation time; and updates the prediction model based on the observed priority level.

12. The system of claim 11, wherein the management agent categorizes the effective activation time into one of a plurality of a categories, wherein each of the plurality of categories corresponds to a different priority level.

13. The system of claim 11, wherein the management agent receives second user actions from a second application on the user device, determines the observed priority level based on the first and second user actions.

14. The system of claim 11, wherein determining a predicted priority level further comprises causing a prediction generator to determine the predicted priority level, wherein the prediction generator is a server located remotely from the user device.

* * * * *